(12) United States Patent
Mercier et al.

(10) Patent No.: US 8,906,189 B2
(45) Date of Patent: Dec. 9, 2014

(54) METHOD OF ADHESIVELY BONDING A STRIP OF FLEXIBLE FABRIC TO A SUBSTRATE

(75) Inventors: Pascale Mercier, Sautron (FR); Pascal Lanvin, Guerande (FR); Edouard Lenhardt, Nantes (FR)

(73) Assignee: Chantiers de l'Atlantique, Levallois-Perret (FR)

( * ) Notice: Subject to any disclaimer, the term of this patent is extended or adjusted under 35 U.S.C. 154(b) by 1099 days.

(21) Appl. No.: 12/085,263

(22) PCT Filed: Nov. 17, 2006

(86) PCT No.: PCT/FR2006/051187
§ 371 (c)(1),
(2), (4) Date: Apr. 1, 2009

(87) PCT Pub. No.: WO2007/057614
PCT Pub. Date: May 24, 2007

(65) Prior Publication Data
US 2009/0205774 A1 Aug. 20, 2009

(30) Foreign Application Priority Data
Nov. 18, 2005 (FR) .................................. 05 11721

(51) Int. Cl.
| | |
|---|---|
| *B32B 37/10* | (2006.01) |
| *C09J 5/06* | (2006.01) |
| *B32B 37/12* | (2006.01) |
| *B32B 38/00* | (2006.01) |
| *B32B 38/16* | (2006.01) |

(52) U.S. Cl.
CPC . *C09J 5/06* (2013.01); *B32B 37/12* (2013.01); *B32B 37/1292* (2013.01); *B32B 38/0008* (2013.01); *B32B 38/162* (2013.01); *B32B 2309/02* (2013.01); *B32B 2309/04* (2013.01); *B32B 2309/12* (2013.01); *B32B 2310/14* (2013.01); *B32B 2311/24* (2013.01); *B32B 2315/085* (2013.01); *F17C 2203/0646* (2013.01); *F17C 2203/0663* (2013.01); *F17C 2209/227* (2013.01); *F17C 2209/232* (2013.01); *F17C 2223/0161* (2013.01); *F17C 2223/033* (2013.01); *F17C 2270/0107* (2013.01)
USPC .................................................. 156/272.6

(58) Field of Classification Search
CPC ........ B32B 37/10; B29C 43/52; B29C 65/18; B29C 65/5042; B29C 65/505
USPC .................................. 156/272.2, 281, 306.6
See application file for complete search history.

(56) References Cited

U.S. PATENT DOCUMENTS

| | | | | |
|---|---|---|---|---|
| 5,759,659 | A | * | 6/1998 | Sanocki et al. .................. 428/74 |
| 6,035,795 | A | * | 3/2000 | Dhellemmes et al. ...... 114/74 A |
| 6,821,379 | B2 | * | 11/2004 | Datta et al. ............... 156/345.43 |

FOREIGN PATENT DOCUMENTS

| | | |
|---|---|---|
| FR | 2302982 | 10/1976 |
| FR | 2341536 | 9/1977 |

(Continued)

OTHER PUBLICATIONS

Machine Translation of KR 2005015840 A, Feb. 2005.*

(Continued)

*Primary Examiner* — Daniel McNally
(74) *Attorney, Agent, or Firm* — Abelman, Frayne & Frayne

(57) ABSTRACT

The invention relates to a method of bonding a strip of flexible sheet onto at least one flexible or rigid support, said sheet and said support including at least one continuous fine metal foil sandwiched and bonded between two fiberglass fabrics. In accordance with the invention, the method includes a step of pressing said strip of flexible sheet against the support by means of a press while simultaneously heating said strip for at least a portion of the duration over which pressure is applied.

18 Claims, 2 Drawing Sheets

(56) References Cited

FOREIGN PATENT DOCUMENTS

Figure 1:
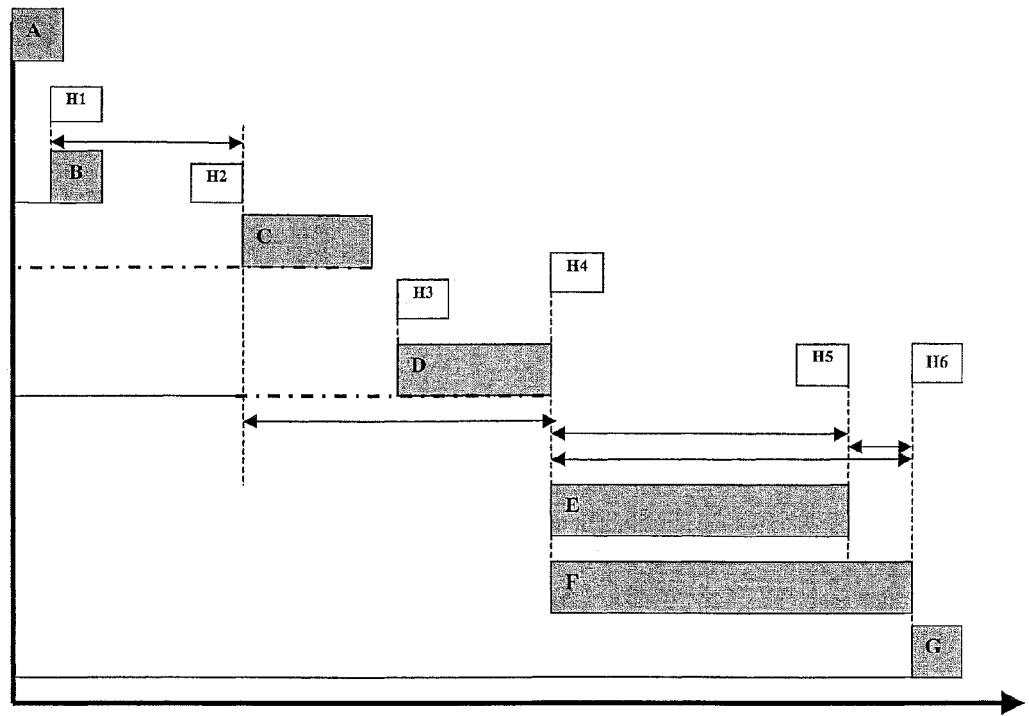

| | | |
|---|---|---|
| FR | 2822815 | 10/2002 |
| FR | 2868060 | 9/2005 |
| FR | 2873308 | 1/2006 |
| KR | 10-2005-0015840 | 2/2005 |
| KR | 2005015840 A * | 2/2005 |
| KR | 100553017 B1 | 2/2006 |
| WO | 2007052961 | 5/2007 |

OTHER PUBLICATIONS

Definition of "Press", "http://oxforddictionaries.com/us/definition/american_english/press", Sep. 18, 2013.*
International Preliminary Report on Patentability of PCT/FR2006/051187 dated Oct. 6, 2008.
B.C. Duncan et al.; "The Performance of Adhesive Joints"; Report No. 1—"The Preparation of Bulk Adhesive Samples for Mechanical Testing"; MTS Adhesives Project 1; Jan. 1994.
Fourth International Conference; "ADHESION '90"; Sep. 10-12, 1990; Queens College, The University of Cambridge.
Michael J. Bodnar; "Processing for Adhesives Bonded Structures"; Applied Polymer Symposia No. 19; 1973.
Dominique Paulet; "Naval Architecture Knowledge and Practice"; 1998.
Written Opinion on the Patentability of the Invention for FR0511721 dated Jul. 17, 2006.
Written Opinion of the International Searching Authority for International Application No. PCT/FR2006/051187 dated Mar. 16, 2007.
EPO Opposition GTT Brief 1 dated Jul. 15, 2009.
EPO Opposition GTT Brief 2 dated Feb. 18, 2010.
French Court Decision—*Chantiers De L'Atlantique* vs. *GazTransport & Technigaz* dated Mar. 18, 2011.
EPO Opposition Summons to Oral Proceedings dated Oct. 27, 2011.
EPO Opposition GTT Brief 3 dated Dec. 2, 2012.
EPO Opposition Decision dated Sep. 7, 2012.
EPO Opposition Minutes of Oral Proceedings dated Sep. 7, 2012.
Opposition Letter from Christian Riege of Capri Intellectual Property Firm to Monsieur Dury Olivier regarding International Patent Application No. PCT/FR2006/051187 dated Sep. 14, 2007.
Pierre Jean et al.; "The Construction and Deployment of the Hypolite Worms"; When Methane Takes the Sea; Chapter 8; Gaz Transport & Technigaz 1998.
Comparison of Different Bonding Procedures for Simple Shear Specimens ESMECA-DMD-001047; GTT; Jan. 2, 2012.
"Adhesives—Determination of Tensile Lap-Shear Strength of Rigid-To-Rigid Bonded Assemblies"; ISO Third Edition; 2003.
Philippe Cognard et al.; "Industrial Bonding"; C.E.P. Editors; 1982.
Couvrat; "Modern Structural Adhesive Bonding"; Tec & Boc—La Voisier; 1992.
"Technical Report—Bondship Guidelines: Recommended Practices"; Report No. 2004-0193; 2005.
W.R. Broughton et al.; Review of Surface Characterisation Techniques for Adhesive Bonding; Project MMS8 Report No. 2; 2002.
Bruce Duncan et al.; National Physical Laboratory; "A National Measurement Good Practice Guide"; dti No. 72; Characterising Strength of Adhesion; Jul. 2004.
"Erection Handbook Section IV—Bonding of Secondary Barrier & Top Bridge Pads"; Gaztransport & Technigaz; 2003.
Uzin KR 430 Polyurethane Adhesive; Unipro; 2007.
Pierre Jean et al.; "Membranes"; When Methane Takes the Sea; Chapter 6; Gaz Transport & Technigaz 1998.
E-mail from GTT—Project Management Team 1 regarding Ring zone bonding of the flexible triplex; Nov. 17, 2003.
Sworn Statement and Publications of Michel Barquins dated Feb. 9, 2010.
Report of Michel Barquins regarding Patent No. 2893625 dated Feb. 9, 2010.
E.H Schindel-Bidenelli; "The Practice of Industrial Bonding"; Tec Doc—Lavoisier; 1992.
H. Monternot; "Bonding Guide"; CETIM; 1978.
Cognard; "Adhesives and Sealants Basic Concepts and High Tech Bonding"; Elsevier; 2005.
Petrie; Epoxy Adhesive Formulations; McGraw-Hill; 2006.
Skeist; "Handbook of Adhesives"; Van Nostrand Reinhold; 1990.
Araldite 2000; "The Selection Guide for Adhesives"; Vantico Ltd. 2002.
J.J. Meynis et al; "Glues and Adhesives and Their Industrial Use III the Bonding of Metals and Plastics"; Guy Le Prat; 1979.
3M Aerospace Product Guide; Mar. 2002.
Cyril A . Dostal; "Adhesives and Sealants"; Engineered Materials Handbook vol. 3; 1990.
Sworn Statement and Biography of Bruce Duncan dated Feb. 27, 2010.
Duncan; Opinion of Patent Application No. US 2009/0205774A1 dated Feb. 27, 2010.
Cagle; "Handbook of Adhesive Bonding"; 1973.
J. Shields; "Adhesives Handbook"; The Butterworth Group; 1970.
Robert D. Adams; "Structural Adhesive Joints in Engineering"; Elsevier Applied Science Publishers Ltd.; 1984.
Irving Katz; "Adhesive Materials: Their Properties and Usage"; Foster Publishing Company; 1964.
Standard Guide for Preparation of Metal Surfaces for Adhesive Bonding; ASTM Designation D2651-90 (Reapproved 1995).
Standard Test Method for Peel Adhesion of Pressure-Sensitive Tape; ASTM Designation D3330/D 3330M-02. 2002.
Duncan et al.; "The Performance of Adhesive Joints"; Project PAJex2—Flexible Adhesives; PAJex2 Report No. 1; Apr. 2000.
Duncan et al.; "A Review of Adhesive Bonding Assemly Processes and Measurement Methods"; Project MMS9 Report No. 1; Mar. 2003.
Stefan Semerdjiev; "Metal-to-Metal Adhesive Bonding"; 1970.
Duncan et al.; "Characterisation of Flexible Adhesives for Design"; Measurement Good Practice Guide; Crown Copyright 2001.
Broughton et al.; "Preparation and Testing of Adhesive Joints"; Measurement Good Practice Guide; Crown Copyright 2002.
Alner; "Aspects of Adhesion"; proceedings of the conferences held at The City University, EC1 on Apr. 5 and 6, 1967 and Apr. 9 and 10, 1968; University of London Press; 1969.
Shires et al; "The Use of Taguchi Statistical Analysis to Improve Manufacturing Processes Using Adhesive Bonding"; European Adhesion Conference; Churchill College, Cambridge, UK; Sep. 3-6, 1996.
Brewis et al.; "The durability of some epoxide adhesive-bonded joints on exposure to moist warm air"; Int.l. Adhesion and Adhesives; IPC Business Press Limited; 1980.
K.W. Allen et al.; "Cold-setting adhesives for repair purposes using various surface preparation methods"; Int. 1. Adhesion and Adhesives; 1982.
"Structural /Multi-Resistant Bonding with Engineering Adhesives—A Simple Design Guide"; 3M Innovation; 1994.
Hall et al.; "The Performance of Adhesive Joints"; Report 2 Summary Report—"Optimisation of Key Process Parameters"; MTS Adhesives Project 5 Measurements for Optimising Adhesives Processing; 1993-1996.
Hall et al.; "The Performance of Adhesive Joints"; Report 3 Case Study—"Precision Mechanical Assembly in the Business Machines Industry"; MTS Adhesives Project 5 Measurements for Optimising Adhesives Processing; 1993-1996.
Tilbury et al.; "The Performance of Adhesive Joints"; Report 4 Case Study—"Packaging Applications 1 & 2: Summary Report"; MTS Adhesives Project 5 Measurements for Optimising Adhesives Processing; 1993-1996.
Tilbury et al.; "The Performance of Adhesive Joints"; Report 5 Case Study—"Packaging Application 1: Full Report"; MTS Adhesives Project 5 Measurements for Optimising Adhesives Processing; 1993-1996.
Tilbury et al.; "The Performance of Adhesive Joints"; Report 6 Case Study—"Packaging Application 2: Full Report"; MTS Adhesives Project 5 Measurements for Optimising Adhesives Processing; 1993-1996.

(56) References Cited

OTHER PUBLICATIONS

T.B. Jones et al.; "The Performance of Adhesive Joints"; Report 7 Case Study—"Access Flooring Application"; MTS Adhesives Project 5 Measurements for Optimising Adhesives Processing; 1993-1996.
S. Hurley et al.; "The Performance of Adhesive Joints"; Report 8 Case Study—"Steel Plate Bonding"; MTS Adhesives Project 5 Measurements for Optimising Adhesives Processing; 1993-1996.
Martin Hall et al.; "The Performance of Adhesive Joints"; Report 9 Case Study—"Draft Code of Best Practice"; MTS Adhesives Project 5 Measurements for Optimising Adhesives Processing; 1993-1996.
Opposition Against Patent EP 1968779, Response to the Holder's Memorandum of Appeal; May 21, 2013.
Araldite 2000; "The Selection Guide for Adhesives"; 2002.
Letter and attachments from Eliane Le Tallec to Pierre Frey dated Mar. 7, 2014.
Users Guide to Adhesives Huntsman; 2007.
Report Carma; Apr. 7, 2014.
Oct. 18, 2005 letter from Samsung Heavy Industries Co., Ltd. J.W. Kim, CEO.
Appeal Court of Appeal Brief—Brief GTT; May 26, 2014.
Letter from Bruce Duncan, National Physical Laboratory to Francois Pochart of August & Debouzy Avocets regarding Declaration for CAT Patent dated May 21, 2013.

* cited by examiner

METHOD OF ADHESIVELY BONDING A STRIP OF FLEXIBLE FABRIC TO A SUBSTRATE

The present invention relates to a method of bonding a strip of flexible sheet on at least one flexible or rigid support, said sheet and said support including at least one fine metal foil, e.g. of aluminum, sandwiched and bonded between two fiberglass fabrics, a binder serving to provide cohesion between the fiberglass fabrics and the aluminum.

The bonding method is intended more particularly for use when said strips and supports are subjected to high levels of stress, in particular thermal stresses and/or traction forces.

One particular example of circumstances in which such strips and supports are subjected to this kind of traction is when they are used for making the leaktight and insulating wall of a tank integrated in a load-carrying structure, for example the hull of a ship.

By way of example, such tanks are those used on ships for transporting liquefied gas. They need to be completely leaktight and sufficiently insulating to contain liquefied gas at low temperature while limiting evaporation thereof.

Such walls are constituted by two successive sealing membranes, a primary membrane in contact with the fluid contained in the tank and, a secondary membrane disposed between the primary membrane and the load-carrying structure, these two membranes alternating with two thermally-insulating barriers.

Tank walls are thus known that are constituted by primary insulation of foam associated with a primary membrane of stainless steel, and secondary insulation of foam associated with a secondary membrane that is flexible or rigid. The secondary membrane includes at least one continuous fine metal foil, e.g. of aluminum, sandwiched and bonded between two fiberglass fabrics, a binder serving to provide cohesion between the glass fabrics and the aluminum.

The secondary insulation is disposed beside the hull of the ship.

There also exist walls comprising a primary insulation of foam associated with a membrane made of a material known under the trade name "Invar", and a secondary insulation of foam associated with the flexible or rigid secondary membrane including at least one fine metal foil, e.g. of aluminum, sandwiched and bonded between two fiberglass fabrics, a binder providing cohesion between the glass fabrics and the aluminum. "Invar" is a steel having 36% nickel that is thermally stable over the range −200° C. to +400° C.

The insulating and leakproof walls of these tanks are made up of an assembly of prefabricated panels comprising in succession, between two rigid plates: the secondary thermal insulation; the secondary sealing membrane; and the primary thermal insulation. The primary sealing membrane is then mounted on the set of prefabricated panels covering the load-carrying structure of the ship.

Commonly, each prefabricated panel is generally in the form of a rectangular parallelepiped, the primary insulation element and the secondary insulation element having respectively, in plan view, the shape of a first rectangle and the shape of a second rectangle having sides that are substantially parallel, with the length and/or width of the first rectangle being smaller than those of the second rectangle, so as to provide a peripheral margin.

The continuity of the secondary insulating barrier is achieved by inserting thermally-insulating material between the two adjacent panels.

The peripheral margins of adjacent prefabricated panels and the side walls of the primary insulation elements define slots or passages that can extend over the entire length, width, or height of the tank.

The passages are filled in to provide continuity in the sealing formed by the panels, prior to laying the primary membrane. Continuity for the primary insulating barrier is obtained by inserting blocks in the passages. Nevertheless, in order to ensure continuity of sealing for the secondary membrane, at the junctions between two panels, and prior to said blocks being put into place, said peripheral margins are covered by a strip of flexible sheet including at least one continuous fine metal foil.

Assembling such panels requires operating procedures to be very strict and assembly to be performed with great accuracy in order to guarantee thermal insulation and leaktightness for the tank.

The bonding of the strip of flexible sheet and the sealing achieved in this way between two adjacent panels needs to be particularly accurate in order to satisfy the various mechanical and lifetime stresses to which the assembly of panels is directly subjected.

The tanks of such ships are subjected to numerous stresses:
 the cooling-down of the tank prior to being filled at very low temperatures, e.g. about −160° C. for methane, or even temperatures close to −170° C., leads to deformations in the wall of the tank due to thermal contraction of its material;
 when the ship is sailing it is subjected to numerous stresses, such as swell, that cause its hull to become deformed and that thus deform the walls of the tank by repercussion; and
 movements of the cargo which lead to additional pressure or back pressure constraints on the walls of the tank.

Thus, the junction zones between adjacent panels are zones that are subjected to a variety of traction stresses and they therefore need to present good mechanical strength over time so as to avoid breaking the continuity of the secondary sealing barrier.

In the prior art, a method is already known for making the secondary sealing at the peripheral margins of prefabricated panels, that method consisting in:
 de-dusting the bonding zone;
 depositing adhesive of the epoxy or polyurethane type on the margins of the panel, either by means of a spatula after taking a previously-weighed volume of said adhesive as a function of the area on which it is to be applied, or else using an adhesive deposition device such as that described in the French patent application filed under the No. FR 2004 0051648;
 smoothing the film of adhesive;
 unrolling a continuous flexible strip available in roll form onto the adhesive-coated margins;
 roller-pressing the deposited flexible strip so as to eliminate any residual bubbles;
 unrolling a protective film, e.g. of the polyethylene type, onto the flexible strip already in place, in order to mitigate the problem of adhesive overflowing from the flexible strip, and finally
 applying pressure to the adhesive-coated strip for the time required for the adhesive to polymerize, which time is a function of ambient temperature.

The strip of flexible sheet covered in the protective film is maintained under a pressure of about 0.1 bar to 0.2 bar, depending on the type of resin, and for a duration that is a function of the ambient temperature at which bonding is performed.

Table 1 below summarizes these parameters for an epoxy type adhesive having two components (i.e. resin and hardener).

TABLE 1

| | Ambient working temperature | | | | | |
|---|---|---|---|---|---|---|
| | 15° C. | 20° C. | 25° C. | 30° C. | 35° C. | 40° C. |
| Duration over which pressure is applied (hours) | 12 | 6 | 4 | 3 | 3 | 2.25 |

Table 1 shows the lengths of time for which the adhesive-coated strips are subjected to pressure as a function of working temperatures, these pressure-application durations being a function of polymerization times that are listed for epoxy adhesives having resin and hardener components with a hardener to resin ratio of about 0.55 by weight.

It can be seen that depending on working temperatures, polymerization times can vary very widely.

When an adhesive bonding method is implemented industrially, it must be capable of being reproducible, while the enormous variations that exist in setting times as a function of ambient temperature make this impossible if the method is used under conditions where temperatures vary considerably. This applies in particular when such an adhesive bonding method is performed outdoors or indoors in non-heated premises, i.e. when subject to variations in the weather.

In the particular circumstances of building a ship for transporting liquefied gas, it can thus be seen that these times for applying pressure and thus for allowing the adhesive to polymerize vary in non-negligible manner over the time taken to build the various tanks, i.e. over the seasons.

A variant of the above-described method is described in French paten application No. FR 2004 0051798, and consists in prior application of adhesive to the flexible strips before they are put into place on the bonding zone.

At present, such a method is commonly used in the shipbuilding industry for building ships for transporting liquefied gas, such as methane tankers.

That technique has the drawback of providing bonds in which breaks are for the most part not cohesive. Inspection tests performed at −170° C. show that there is an unacceptable quantity of adhesion rupture, even though the criteria for breaking stress in shear and in perpendicular traction are satisfied.

In the description below, the term "adhesion rupture" designates a break of the bonding that occurs at the interface between the layer of adhesive and the strip or the support, whereas the term "cohesion rupture" is used to designate a break in the bonding that occurs within the thickness of the layer of adhesive.

Finally, French patent FR 2 822 815 discloses a method and apparatus for providing secondary sealing at the peripheral rims of prefabricated panels. This patent discloses either to first heat a strip comprising a hot melt adhesive, and then to press the strip previously heated to bond it, or to first press the strip having a hot melt adhesive, and then to heat the bonded strip to accelerate the polymerization of the adhesive.

In the second embodiment, the apparatus includes, amongst other things, means for unrolling a strip of flexible sheet in the passage that exists between two prefabricated panels, heater shoes suitable for being applied against the flexible strip to initiate cross-linking of the adhesive, and cooler shoes suitable for increasing the viscosity of the adhesive. That apparatus has the drawback of being complex and of not remedying the above-mentioned drawbacks. In addition, such apparatus does not keep the strip under pressure during heating.

The invention seeks to remedy the above-mentioned drawbacks of the prior art.

A particular object of the invention is to provide a method of bonding a strip of flexible sheet on at least one flexible or rigid support, said sheet and said support including at least one continuous fine metal foil sandwiched and bonded between two fiberglass fabrics, the method satisfying targets concerning strength when cold, cohesion rupture, reproducibility, and durability of the bonding.

More precisely, an object of the invention is to provide such a bonding method that provides mechanical strength when cold (in the vicinity of −160° C. to −170° C.) of at least 3.5 megaspascals (MPa) in shear, perpendicular traction strength when cold (−170° C.) greater than 3 MPa, and ruptures that are cohesive in appearance.

To this end, the invention provides a method of the above-specified type that comprises the following successive steps:
de-dusting the bonding zone;
depositing a uniform film of polymerizable adhesive on at least one of the two surfaces of the flexible sheet and of the support that are to be bonded together;
smoothing said film of adhesive;
placing the strip of flexible sheet on the support;
roller-pressing the deposited flexible sheet so as to eliminate any residual bubbles; and
placing on said flexible sheet a film to provide protection against adhesive overflowing around said flexible sheet, the protective film being of dimensions greater than those of the flexible sheet.

In accordance with the invention, the method includes a subsequent step of pressing said strip of flexible sheet against the support by means of a press, and of simultaneously heating said strip during at least a portion of the duration for which pressure is applied.

By means of these characteristics of the invention, and in particular by associating the application of pressure and of heat, bonding of excellent quality is obtained, with greater cohesion and with the expected cohesion rupture being obtained systemically.

Advantageously, the pressure applied lies in the range about 50 millibars (mbar) to 200 mbar, the temperature to which the bonded strip is raised lies in the range about 50° C. to 70° C., and the duration of the heating lies in the range about 1 hour (h) to 7 h.

More preferably, the pressure applied is about 100 mbar, the temperature to which the bonded strip is heated is about 60° C., and the duration of heating lies in the range 3 h to 4 h.

These heating parameters combined with applying pressure to the strip being bonded serve to maximize adhesion by obtaining mechanical strength when cold (−170° C.) that is greater than 10 MPa in shear and able to withstand perpendicular traction when cold that is much greater than 3 MPa, and they also guarantee bonding that is reproducible and durable with cohesion rupture being obtained systemically.

Advantageously, after the pre-dusting step and before the step of depositing the adhesive, protective adhesive tapes are put into place on the support around the future zone for bonding to the strip of flexible sheet, in order to protect the support from any excessive overflow of adhesive.

Preferably, the bonding zone is subjected to plasma treatment prior to the step of depositing adhesive and after the protective adhesive tapes have been put into place, if such tapes are used.

The plasma treatment provides better preparation of the surface, in particular in industrial conditions where there is a high risk of the zones to be bonded becoming polluted, while avoiding the use of solvents that are expensive and dangerous. The plasma treatment also serves to activate the surface, thereby increasing its wettability and thus enabling the adhesive to adhere better to the surface.

According to other advantageous characteristics of the invention, taken singly or in combination:

- the step of depositing the adhesive is performed within 3 h at most after the beginning of the plasma treatment, or better within 90 minutes (min) at most after the beginning of the plasma treatment;
- the method it is performed in a controlled atmosphere in which relative humidity is no more than 60%;
- the method is performed under controlled ambient temperature lying in the range 20° C. to 25° C.;
- the method is performed while maintaining the temperature of the adhesive at the moment of its application in the range 25° C. to 30° C.;
- when the bonding is performed using a two-component epoxy adhesive, the step of applying pressure and of heating the strip of flexible sheet is performed no more than 45 min after said adhesive has been deposited;
- when the bonding is performed using a polyurethane adhesive, the step of applying pressure and heating the strip of flexible sheet is performed no more than 15 min after said adhesive has been deposited;
- the heating of the bonded strip of flexible sheet is stopped at least 30 min before ceasing to apply pressure; and
- when the strip of flexible sheet is applied over two adjacent supports, pressure is applied while applying additional continuous pressure on the zone of said strip that is situated over the junction line between the two supports, so as to create in said line a deformation of the strip that penetrates into the junction zone and thus absorbs the wrinkles that appear over the length of said strip of flexible sheet.

When heating a strip of great length, e.g. longer than 2 meters (m), wrinkles appear with this method in the length of the flexible strip, and that is harmful for achieving the target levels of bonding. By positioning such flexible strips of great length astride two adjacent supports and by applying continuous pressure at the junction, a wave is established that penetrates into the junction zone and that thus absorbs the wrinkles that might be formed, while the adhesive is not completely polymerized, the strip can become re-tensioned easily.

The combination of all these parameters makes it possible in preferred manner to optimize and better control the bonding of strips of flexible sheet that include at least one continuous fine metal foil sandwiched and bonded between two glass fabrics, on a flexible or rigid support including at least one continuous fine metal foil sandwiched and bonded between two glass fabrics.

In an advantageous implementation of the invention, the above-described method is applied to bonding a strip of flexible sheet, applied to making a wall of a lagged tank for confining a fluid such as a liquefied gas, the tank being integrated in the load-carrying structure of a ship, said wall being formed by assembling together a plurality of prefabricated panels, each comprising a sealing membrane inserted between two thermally-insulating barriers. In accordance with the invention, said strip of flexible sheet provides continuity of sealing for said sealing membrane at the junctions between two prefabricated panels.

Figure 2:
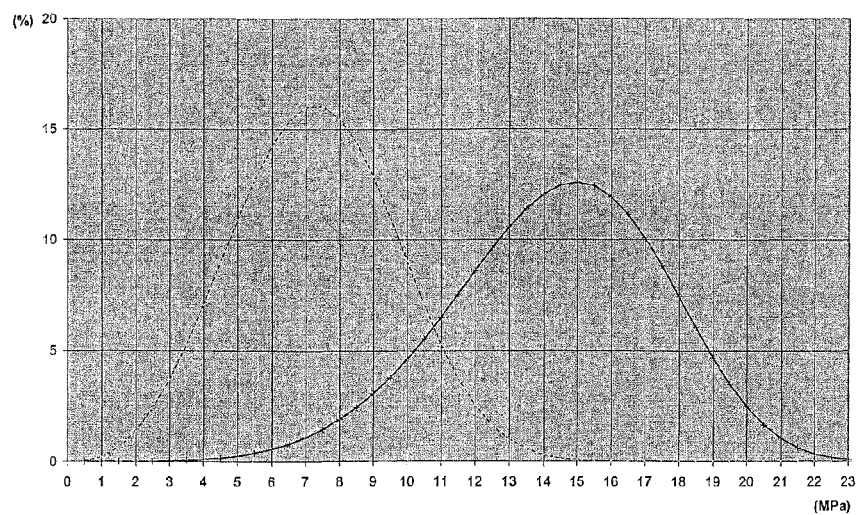
Figure 3:
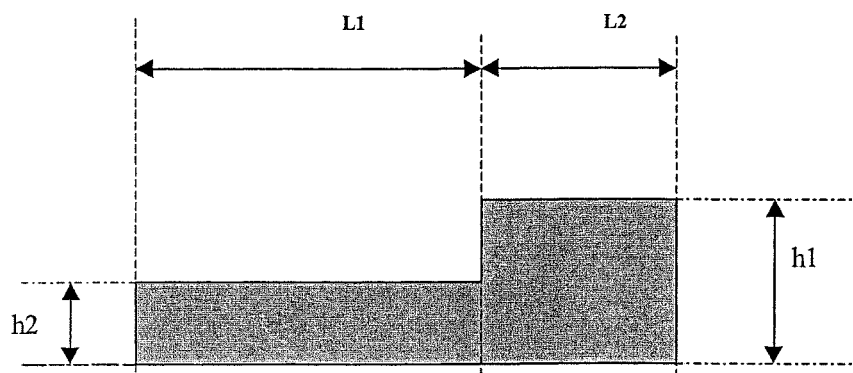
Figure 4:
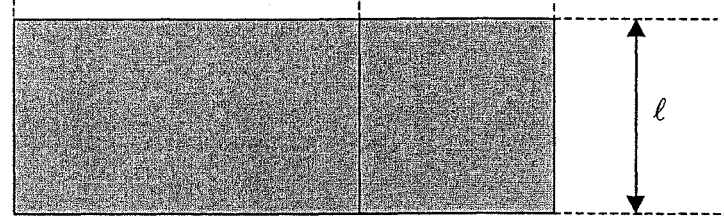

The invention can be better understood on reading the description below. The description is given purely by way of example and is made with reference to the accompanying drawings, in which:

FIG. 1 shows the various steps of a method of the invention;

FIG. 2 plots comparative curves of shear stress breakage tests on bonds obtained respectively by the prior art and by the invention; and FIGS. 3 and 4 show a testpiece used in the experiments represented by FIG. 2, respectively in side view and in plan view.

FIG. 1 shows the various steps over time in a method of the invention. In this implementation, all of the parameters are optimized to achieve bonding that presents good mechanical strength and in which rupture is always cohesive.

The first step is to prepare the working zone, if not already prepared, so that it lies at a temperature in the range 20° C. to 25° C. with humidity being not more than 60%, and preferably being about 50%. These temperature and humidity parameters should be monitored throughout the implementation of the method of bonding strips of flexible sheet.

There follows a description with reference to FIG. 1 of one particular implementation of the method in accordance with the invention.

It begins with a de-dusting step A of removing dust, e.g. by vacuuming, so as to be certain of having a bonding zone that is totally clean, without any elements that might pollute the subsequent bonding.

Once dust removal has been completed, protective adhesive tapes are placed along the edges of the bonding zone.

Thereafter, starting at time reference H1, plasma treatment step B serves to further clean the surface and to prepare the bonding zone by activating its surface.

This step B is performed after protective adhesive tape has been put into place so as to avoid any action on this zone before the adhesive is deposited.

Within a period H1 to H2 having a maximum duration of 3 h and preferably of 90 min, step C of depositing adhesive is initialized, with the period H1 to H2 being determined by the length of time for which the plasma treatment of the surface remains effective.

The adhesive is preferably deposited by means of a device for depositing beads of adhesive, as described in French patent application No. FR 2004 0051648, after which said deposited beads of adhesive are smoothed. During this step, temperature at the outlet from the deposition device can be monitored in order to verify that the adhesive is at a temperature lying in the range 25° C. to 30° C., and when using a two-component adhesive, checks can be performed regularly on the hardener to resin ratio by any means known to the person skilled in the art, e.g. by measuring color.

Following this step C, step D of putting the flexible sheet strip into place, of roller-pressing, and of putting a protective film into place is launched quickly, said step D terminating directly in step F of applying pressure to the adhesively-bonded strip. Between H2 marking the beginning of step C and H4 marking the beginning of step F, a maximum duration H2 to H4 of 45 min is allowed when using a two-component epoxy adhesive, or of 15 min when using a polyurethane adhesive.

At H4, steps F and E are both begun simultaneously. These two steps E and F are performed by a common heater and presser tool, with heating being independent of applying pressure. Thus, it is possible to perform heating over a period H4 to H5 having a duration of about 3 h 30 min, while continuing to apply pressure over a period H5 to H6 having a minimum duration of 30 min. This allows the adhesive to cool prior to step G of removing the presser tool, so that the adhesive has reached a degree of viscosity that is sufficient to allow the device to be withdrawn without any consequences on the bonding of the strip.

This step E is performed with the bonded strip being heated to a temperature of about 60° C., and step F is performed by applying a pressure of about 0.1 bars.

The method described above is not limiting. It is sometimes possible to omit the plasma treatment step. Furthermore, the same parameters, steps, and periods between steps remain valid when using flexible sheet strips that have previously been coated in adhesive, and that are put into place directly on the bonding zone.

When using flexible sheet strips that are bonded over two adjacent flexible or rigid supports, an additional step (not shown in FIG. 2) is implemented between step D and the simultaneous steps E and F. Thus, using a device positioned at the junction between the two supports and capable of being inserted in said junction, and being positioned over the flexible strip and under the device for applying pressure, continuous and sufficient pressure is applied on the strip of flexible sheet to create deformation in said strip at the junction zone, said deformation having the function of absorbing the wrinkles that appear along the flexible strip when it is heated. This disposition is particularly necessary for strips of great length, e.g. of length greater than 2 m.

FIG. 2 shows the results of shear tests performed using aluminum testpieces as shown in FIGS. 3 and 4.

The dimensions of the testpieces used were h1=40 mm, h2=20 mm, L1=85 mm, L2=50 mm, and $\ell$=50 mm.

A sample of flexible sheet strip including a fine aluminum foil having a thickness of about 70 micrometers (μm) sandwiched between two fiberglass fabrics, with an elastomer binder, e.g. based on polychloroprene for bonding the glass fabric to the aluminum, was stuck to the 50 mm by 50 mm square portion of the first testpiece using a polyurethane adhesive.

Similarly, a rigid support sample comprising a fine aluminum foil having thickness of about 70 μm sandwiched between two glass fabrics with a binder, e.g. based on polyamide or polyester for bonding the glass fabric and the aluminum, was stuck to the 50 mm by 50 mm square portion of the second testpiece, using a polyurethane adhesive.

Finally, an epoxy adhesive comprising a resin component and a hardener component with a hardener to resin ratio of 0.55 by weight was applied as a layer between the flexible sheet and the rigid support.

Tests were carried out at −170° C.

They were performed in comparative manner, using the prior art bonding method (no heating) and using the method of the invention.

The curves show the probability of rupture as a function of the applied shear stress.

The dashed-line curve shows the results for a testpiece prepared using the prior art method and the continuous-line curve shows the results for a testpiece prepared using the method of the invention.

For the dashed-line curve, 100% of ruptures were adhesion ruptures, whereas for the continuous-line curve, 100% of ruptures were cohesion ruptures. It can also be seen clearly that the ability to withstand shear was greater with the method of the invention: the limit going from 7.5 MPa to 15 MPa (at −170° C.).

Thus, with the method of the invention, the bonding obtained presents better shear strength at −170° C., and the ruptures are cohesion ruptures.

The method according to the invention also allows to obtain better results compared to methods where pressure is first applied, and heat is applied afterwards. If this type of method allows to accelerate the polymerization of the adhesive, it does neither improve the bonding strength of the adhesive nor the bonding properties.

In particular, the invention allows to control precisely the temperature while pressure is applied, which avoids any risks related to temperature variations, which may occur in situ during the bonding phases (in particular during winter time). The homogeneity of the bonding is thus strongly improved.

The invention claimed is:

1. A method of bonding a strip of flexible sheet on at least one rigid support, said strip of flexible sheet constituting a part of a sealing membrane for a wall of an insulated tank for confining a liquefied gas, integrated into a load-carrying structure of a ship, said sheet and said support comprising at least one continuous thin metal foil, bonded in a sandwich between two glass fiber fabrics, said insulated tank wall being formed by assembling a plurality of prefabricated panels each of which comprises a seal membrane inserted between two thermally-insulating barriers, said strip of flexible sheet providing continuity of sealing of said sealing membrane at a junction between two prefabricated panels;

the method comprising the following successive steps of:
de-dusting a bonding zone;
depositing a uniform film of polymerizable adhesive on at least one of the two surfaces of the flexible sheet and of the support that are to be bonded together;
smoothing said film of adhesive;
placing the strip of flexible sheet on the support;
roller-pressing the deposited flexible sheet so as to eliminate any residual bubbles; and
placing on said flexible sheet a film to provide protection against adhesive overflowing around said flexible sheet, the protective film being of dimensions greater than those of the flexible sheet;

the method comprising subsequently:
a step of applying pressure on said strip of flexible sheet against the support by means of a press, and of simultaneously heating said strip for at least part of the time during which pressure is applied, said pressure and said heating being simultaneously applied to the whole strip.

2. The method of bonding according to claim 1, wherein after the de-dusting step and before the step of depositing the adhesive, protective adhesive tapes are put into place on the support around the bonding zone to be bonded to the strip of flexible sheet, in order to protect the support from any excessive overflow of adhesive.

3. The method of bonding according to claim 2, wherein the bonding zone is subjected to plasma treatment prior to the step of depositing adhesive and after the protective adhesive tapes have been put into place.

4. The method of bonding according to claim 3, wherein the step of depositing adhesive is performed within a maximum period of 3 h after the beginning of the plasma treatment.

5. The method of bonding according to claim 4, wherein the step of depositing adhesive is performed within a maximum period of 90 min after the beginning of the plasma treatment.

6. The method of bonding according to claim 5, wherein the method is performed under controlled ambient temperature lying in the range 20° C. to 25° C.

7. The method of bonding according to claim 6, wherein the method is performed in a controlled atmosphere in which relative humidity is no more than 60%.

8. The method of bonding according to claim 7, wherein the method is performed while maintaining the temperature of the adhesive at the moment of its application in the range 25° C. to 30° C.

9. The method of bonding according to claim 1, wherein the pressure applied during heating lies in the range about 50 mbar to 200 mbar, in that the temperature to which the bonded strip is raised lies in the range about 50° C. to 70° C., and in that the duration of the heating lies in the range about 1 h to 7 h.

10. The method of bonding according to claim 9, wherein pressure applied is about 100 mbar, in that the temperature to which the bonded strip is heated is about 60° C., and in that the duration of heating lies in the range 3 h to 4 h.

11. The method of bonding according to claim 1, wherein the bonding is performed using a two-component epoxy adhesive, the step of applying pressure and of heating the strip of flexible sheet is performed no more than 45 min after said adhesive has been deposited.

12. The method of bonding according to claim 1 wherein the bonding is performed using a polyurethane adhesive, the step of applying pressure and heating the strip of flexible sheet is performed no more than 15 min after said adhesive has been deposited.

13. The method of bonding according to claim 1, wherein the heating of the bonded strip of flexible sheet is stopped at least 30 min before ceasing to apply pressure.

14. The method of bonding according to claim 1, wherein the strip of flexible sheet is applied over two adjacent supports, pressure is applied while applying additional continuous pressure on the zone of said strip that is situated over a junction line between the two supports, so as to create in said line a deformation of the strip that penetrates into a junction zone and thus absorbs wrinkles that appear over the length of said strip of flexible sheet.

15. A method of bonding a strip of flexible sheet on at least one rigid support, said strip of flexible sheet constituting a part of a sealing membrane for a wall of an insulated tank for confining a liquefied gas, integrated into a load-carrying structure of a ship, said sheet and said support comprising at least one continuous thin metal foil, bonded in a sandwich between two glass fiber fabrics, said insulated tank wall being formed by assembling a plurality of prefabricated panels each of which comprises a seal membrane inserted between two thermally-insulating barriers, said strip of flexible sheet providing continuity of sealing of said sealing membrane at a junction between two prefabricated panels;
the method comprising the following successive steps of:
de-dusting a bonding zone;
depositing a uniform film of polymerizable adhesive on at least one of the two surfaces of the flexible sheet and of the support that are to be bonded together;
smoothing said film of adhesive;
placing the strip of flexible sheet on the support;
roller-pressing the deposited flexible sheet so as to eliminate any residual bubbles; and
placing on said flexible sheet a film to provide protection against adhesive overflowing around said flexible sheet, the protective film being of dimensions greater than those of the flexible sheet;
the method comprising subsequently:
a step of applying pressure on said whole strip of flexible sheet against the support by means of a press, and of simultaneously heating said whole strip for at least part of the time during which pressure is applied, said pressure and said heating being simultaneously applied to the whole strip, wherein the duration of the heating lies in the range about 1 hour to 7 hours.

16. The method of bonding according to claim 15, wherein the duration of heating lies in the range 3 hours to 4 hours.

17. The method of bonding according to claim 15, wherein the temperature to which the bonded strip is heated is between 50° C. and 70° C.

18. A method of bonding a strip of flexible sheet on at least one rigid support, said strip of flexible sheet constituting a part of a sealing membrane for a wall of an insulated tank for confining a liquefied gas, integrated into a load-carrying structure of a ship, said sheet and said support comprising at least one continuous thin metal foil, bonded in a sandwich between two glass fiber fabrics, said insulated tank wall being formed by assembling a plurality of prefabricated panels each of which comprises a seal membrane inserted between two thermally-insulating barriers, said strip of flexible sheet providing continuity of sealing of said sealing membrane at a junction between two prefabricated panels;
the method comprising the following successive steps of:
de-dusting a bonding zone;
depositing a uniform film of polymerizable adhesive on at least one of the two surfaces of the flexible sheet and of the support that are to be bonded together;
smoothing said film of adhesive;
placing the strip of flexible sheet on the support;
roller-pressing the deposited flexible sheet so as to eliminate any residual bubbles; and
placing on said flexible sheet a film to provide protection against adhesive overflowing around said flexible sheet, the protective film being of dimensions greater than those of the flexible sheet;
the method comprising subsequently:
a step of applying pressure on said whole strip of flexible sheet against the support by means of a press, and of simultaneously heating said whole strip for at least part of the time during which pressure is applied, said pressure and said heating being simultaneously applied to the whole strip, wherein the heating of the bonded strip of flexible sheet is stopped at least 30 minutes before ceasing to apply pressure.

* * * * *